(12) United States Patent
Chawla et al.

(10) Patent No.: US 8,554,534 B2
(45) Date of Patent: *Oct. 8, 2013

(54) VIRTUALIZED POLICY TESTER

(75) Inventors: Deepak Chawla, Ocean, NJ (US);
William Beckett, Marlboro, NJ (US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,928

(22) Filed: Jun. 7, 2012

(65) Prior Publication Data

US 2012/0245917 A1   Sep. 27, 2012

Related U.S. Application Data

(63) Continuation of application No. 12/243,608, filed on Oct. 1, 2008, now Pat. No. 8,214,193.

(51) Int. Cl.
*G06F 9/45* (2006.01)
*G06F 15/173* (2006.01)

(52) U.S. Cl.
USPC ............................................ 703/22; 709/223

(58) Field of Classification Search
USPC ............................................ 703/22; 709/223
See application file for complete search history.

(56) References Cited

U.S. PATENT DOCUMENTS

| | | | | |
|---|---|---|---|---|
| 6,516,337 | B1 * | 2/2003 | Tripp et al. | 709/202 |
| 6,651,191 | B1 * | 11/2003 | Vacante et al. | 714/47.1 |
| 8,214,193 | B2 * | 7/2012 | Chawla et al. | 703/22 |
| 2003/0217144 | A1 * | 11/2003 | Fu et al. | 709/224 |
| 2006/0015764 | A1 * | 1/2006 | Ocko et al. | 714/4 |
| 2008/0059625 | A1 * | 3/2008 | Barnett et al. | 709/223 |

* cited by examiner

*Primary Examiner* — Dwin M Craig
(74) *Attorney, Agent, or Firm* — Hoffmann & Baron, LLP

(57) ABSTRACT

Embodiments of the present invention are directed to testing policy changes associated with a production network. A virtual network that represents at least a portion of the production network can be generated. A first transaction log based on a first execution of the virtual network using test traffic and a first set of policies that are implemented in the production network can be obtained. A second transaction log based on a second execution of the virtual network using the test traffic and a second set of policies to be implemented in the production network can be obtained. Based on a comparison of the first and second transaction logs, it can be determined whether the second set of policies has a desired effect in the virtual network.

20 Claims, 6 Drawing Sheets

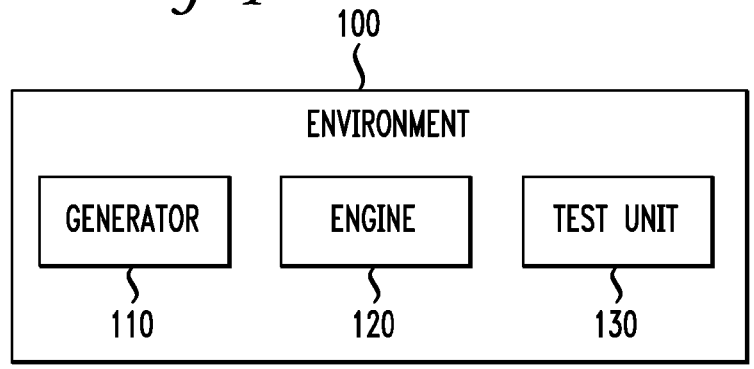
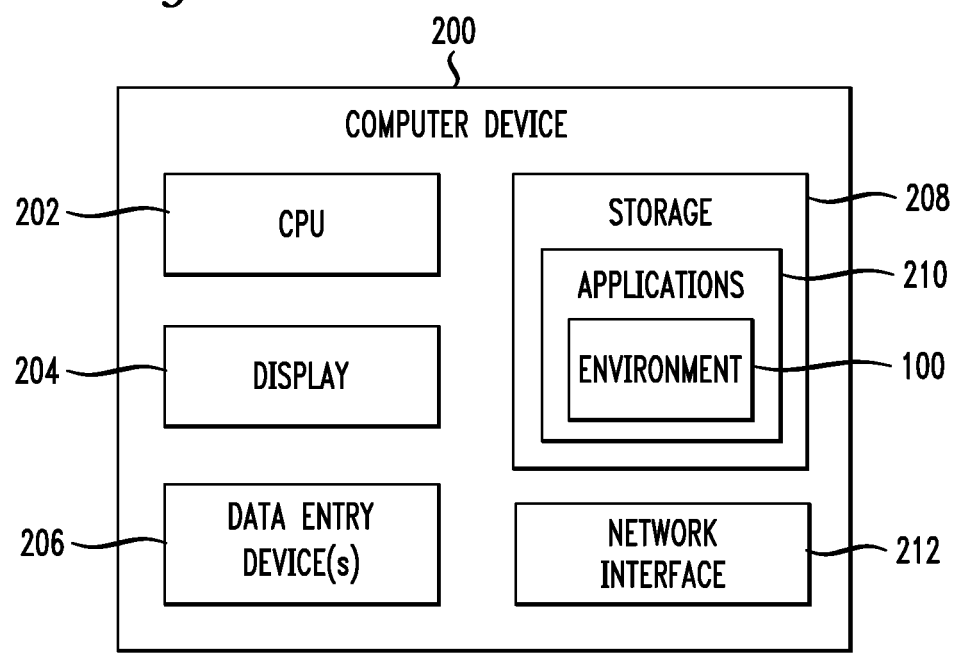

VIRTUALIZED POLICY TESTER

CROSS-REFERENCE TO RELATED APPLICATIONS

The instant application is a continuation of and claims benefit under 35 U.S.C. §120 to prior U.S. patent application Ser. No. 12/243,608 filed Oct. 1, 2008, which has matured into U.S. Pat. No. 8,214,893, the disclosure of which is incorporated herein by reference in its entirety.

BACKGROUND OF THE INVENTION

1. Field of the Invention

The present invention relates to a virtualized policy testing for communication networks.

2. Brief Discussion of Related Art

Customers are frequently required to make changes to device configurations in their network arising from customer policy changes, device vendor updates/patches, or customer networking changes. Changes to configurations of a device may affect the operation of other devices that communicate with the device, as well as the operation of the device itself. Sometimes these changes can have an adverse effect on the customer's network, such as operation failures, application failures, inadvertently blocked data packets, and the like. As a result, customers typically wish to test the effects that configuration changes have on the network to ensure that the changes do not have an adverse effect.

In one approach, configuration changes can be tested in a lab environment. While it may be possible to construct a physical replica of a customer network, some customer networks can be large, complex, and expensive to implement, making replication prohibitive. As a result, customers generally do not replicate their entire network, but rather only test the device in which the configuration is to be changed. After the customer tests the configuration change in the lab environment, the change can be deployed in the production network environment. Since the testing performed in the lab environment typically does not correspond to the customer network where the device normally operates, changes to the device configurations may not operate in a manner suggested by the testing performed in the lab environment.

In another approach, configuration changes can be implemented in the production network. For example, in some situations, testing device configurations in a lab environment may not be feasible, such as, when configuration changes are deployed quickly to protect the customer network from an attack. Once the configuration change is implemented in the production network, the customer can monitor the network to determine if the configuration changes have an adverse effect on the network. However, such adverse effects may not be readily apparent and the customer may not detect any issues for some time.

SUMMARY OF THE INVENTION

Embodiments of the present invention are directed to a method, system, and computer readable medium to facilitate testing policy changes associated with a production network. A virtual network representing at least a portion of the production network can be generated by an environment having a virtual network generator. A first transaction log can be obtained using a test unit of the environment and can be based on a first execution of the virtual network using test traffic generated by a test traffic engine and a first set of policies that are implemented in the production network. A second transaction log can be obtained using the test unit and can be based on a second execution of the virtual network using the test traffic and a second set of policies to be implemented in the production network. Based on a comparison of the first and second transaction logs, a determination can be made as to whether the second set of policies has a desired effect.

The second set of policies can be directed to at least one of an access restriction policy and a traffic regulation policy. The access restriction policy can include at least one of a policy that blocks broadcasts from traversing an interface of a firewall and a policy that prevents traffic from a private address from being forwarded over an Internet access circuit. The traffic regulation policy can include at least one of a policy that blocks traffic from a source IP address, a destination IP address, traffic associated with a particular transmission protocol, or peer-to-peer (P2P) communication.

When it is determined that the second set of policies does not have a desired effect in the virtual network a third set of policies can be generated and a third transaction log can be obtained based on an execution of the virtual network using the test traffic and the third set of policies. A determination can be made as to whether the third set of policies has a desired effect based on a comparison of the first and third transaction logs.

Generation of the virtual network can include obtaining information associated with physical elements of the production network and generating virtual elements of the physical elements based on the information, where the virtual elements model a logical functionality of the physical elements. The information can include at least one of hardware specifications, software specifications, network performance data, an architecture of the production network, and the first set of policies.

The test traffic can be generated based on the first and second sets of policies and can be configured to facilitate determining whether the second set of policies has a desired effect.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 1 is a block diagram of a network virtualization and testing environment in accordance with embodiments of the present invention.

FIG. 2 is an exemplary computing device for implementing embodiments of the present embodiment.

DETAILED DESCRIPTION OF THE EMBODIMENTS

Figure 3:
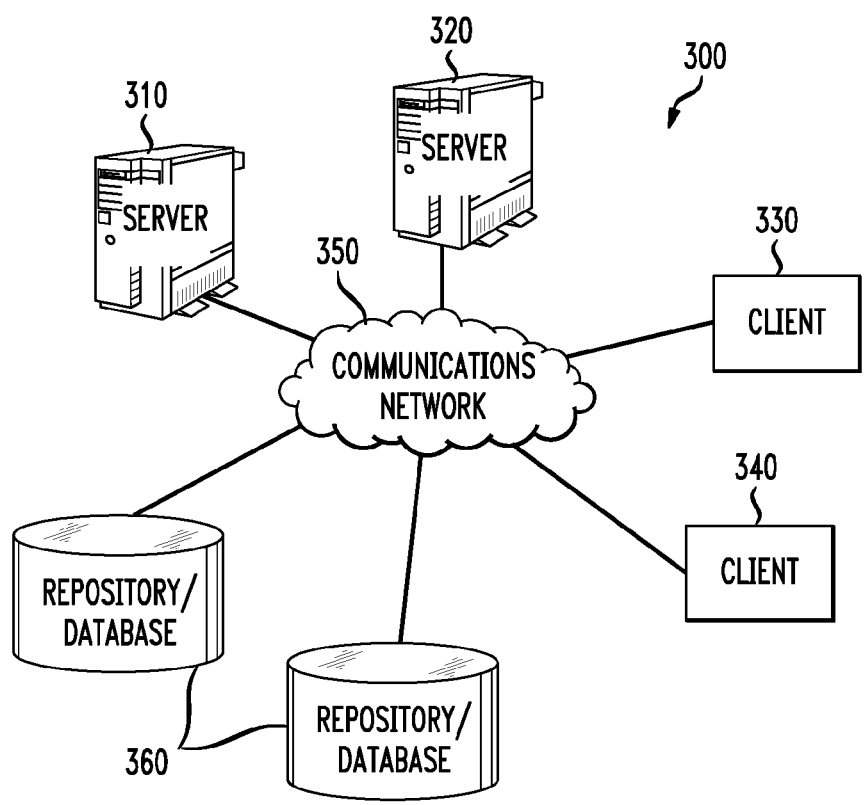
FIG. 3 is a distributed system for implementing embodiments of the present invention.

The embodiments of the present invention include a network virtualization and testing environment (hereinafter "environment") to test policy changes prior to implementation of the policies in a production network, which refers to a physically implemented network that can be operating with actual Internet traffic. Policies govern operations of a network, a network device, an interaction between network devices, and the like, and can include security policies and/or access restriction policies. The environment can generate a virtual network of the production network, which can be validated to ensure that the virtual network is a true representation of the production network. Once a virtual network has been validated, the environment can implement a policy change in the virtual network to observe the impact such a policy change would have in the production network. If the desired impact is achieved by the policy change, the policy change can be deployed in the production network.

FIG. 1 is a block diagram of a network virtualization and testing environment 100 (hereinafter "environment 100"). The environment 100 can include a virtual network generator 110 (hereinafter "generator 110"), test traffic engine 120 (hereinafter "engine 120"), and a policy test unit 130 (hereinafter "test unit 130"). The generator 110 can generate a virtual network that is a software replication of a physically implemented hardware-based production network. The generator 110 generates the virtualized network using information about elements of the production network, such as hardware (H/W) specifications (customer H/W specifications and/or vendor H/W specifications), software (S/W) specifications (customer S/W specifications and/or vendor S/W specifications), network performance and test data (customer, testing organizations, etc), customer production network architecture, current policy configurations implemented by the customer, and the like. The generator 110 can determine how the physical elements of the production network interact and can model communication between the elements based on a model such interaction. The generator 110 can validate and verify the virtual network to ensure that it is a true representation of the production network by comparing transaction logs that are generated based on identical input traffic to the virtual network and the production network. Transaction logs are logs that have information associated with input and output traffic and information associated with how the network, or network device, responded to the traffic.

The engine 120 can obtain existing policy configurations associated with the production network and can also obtain desired policy changes to be tested using the environment 100. The engine 120 can process the existing policy configurations and desired policy changes and can generate test traffic based on the existing policy configurations and desired policy changes. Test traffic refers to simulated Internet traffic that can represent actual network traffic that the production network may encounter during normal operation. The test traffic preferably includes good and bad Internet traffic, such as web traffic, queries, e-mail traffic, peer-to-peer traffic, attacks, viruses, The test traffic generated by the engine 120 is suitable for testing the policies implemented in the virtual network such that the test traffic thoroughly tests the impact of policies in the virtual network as if the network is exposed to the Internet. As result, the user can determine whether the impact of the policies implemented in the virtual network represents the impact desired in the production network.

The test unit 130 uses the test traffic generated by the engine 120 to test the existing policy configurations and/or desired policy changes in the virtual network. The test unit can implement the policies in the virtual network to determine how the virtual network reacts to the policies. For example, the test unit can execute the virtual network using existing policy configuration that are implemented in the production network and can execute the virtual network using desired policy changes that deviate from the existing policy configurations. Transaction logs corresponding to the execution of the virtual network using both the existing policy configurations and the desired policy changes can be maintained. These transaction logs can be compared and it can be determined whether the desired policy changes have an impact on the virtual network that is desired and/or acceptable.

FIG. 2 depicts an exemplary computing device 200 suitable for practicing embodiments of the present invention. The computing device 200 can be a mainframe, personal computer (PC), laptop computer, workstation, handheld device, such as a PDA, a cell phone, or the like. In the illustrated embodiment, the computing device 200 includes a central processing unit (CPU) 202 and a display device 204. The CPU 202 controls each component of the computing device 200 to provide, for example, the environment 100. The display device 204 enables the computing device 200 to communicate directly with a user through a visual display and can graphically render the virtual network, transaction logs, or other information.

The computing device 200 can further include data entry device(s) 206, such as a keyboard, touch screen, mouse, and the like, to allow the user to interact with the environment 100. The computing device 200 can include storage 208 for storing data, such as policy changes, transaction logs, production network information, virtual network elements, instructions including instructions for generating a virtualized network and/or instructions for deploying policy changes in a virtualized network to test the policy changes prior to deployment in a production network modeled by the virtualized network, and the like.

Storage 208 can include such technologies as a floppy drive, hard drive, tape drive, Flash drive, optical drive, read only memory (ROM), random access memory (RAM), and the like. Applications 210, such as the environment 100, can be resident in the storage 208. The environment 100 can include code, including instructions, that when executed can generate a virtualized network based on a production network and can deploy policy changes in the virtualized network to test the policy changes prior to deploying the changes in the production network. The code can be composed of at least one of C, C++, Java, Basic, Perl, assembly language, machine code, and the like. The storage 208 can be local or remote to the computing device 200. The computing device 200 can also include a network interface 212 for communicating with a network and can be used for a distributed implementation. The CPU 202 operates to run the applications, such as the environment 100, in storage 208 by performing instructions therein and storing data resulting from the performed instructions, which may be graphically or otherwise depicted via the display 204.

FIG. 3 depicts an exemplary distributed system 300 for implementing embodiments of the environment 100. The distributed system 300 includes one or more servers 310 and 320 coupled to clients 330 and 340 via a communication network 350, which can be the service provider network, the customer network, and/or another network over which information can be transmitted between devices communicatively coupled to the network. The servers 310/320 and/or the clients 330/340 can be implemented using the computing device 200 of FIG. 1. The distributed system 300 preferably includes one or more repositories or databases 360, which can be in communication with each other, as well as with the servers 310 and 320 and the clients 330 and 340, via a communications network 350.

The servers 310/320, clients 330/340, and/or databases 360 can store information, such as policies being implemented in a production network, previous policy changes, desired policy changes, a virtualized network, elements of the virtualized networks, transaction logs associated with the virtualized and production networks, test traffic, and the like. The environment 100 can be distributed among the servers 310/320, clients 330/340, and databases 360 such that one or more components of the environment 100 can be located at different device (e.g. clients, servers, databases) in the communication network 350. For example, the generator 110 can be resident on the client 330, the test unit 130 can be resident on the client 340, and the engine 120, virtual networks, virtual elements, transaction logs, and other information can be stored by the servers 310/320 and/or databases 360.

Figure 4:
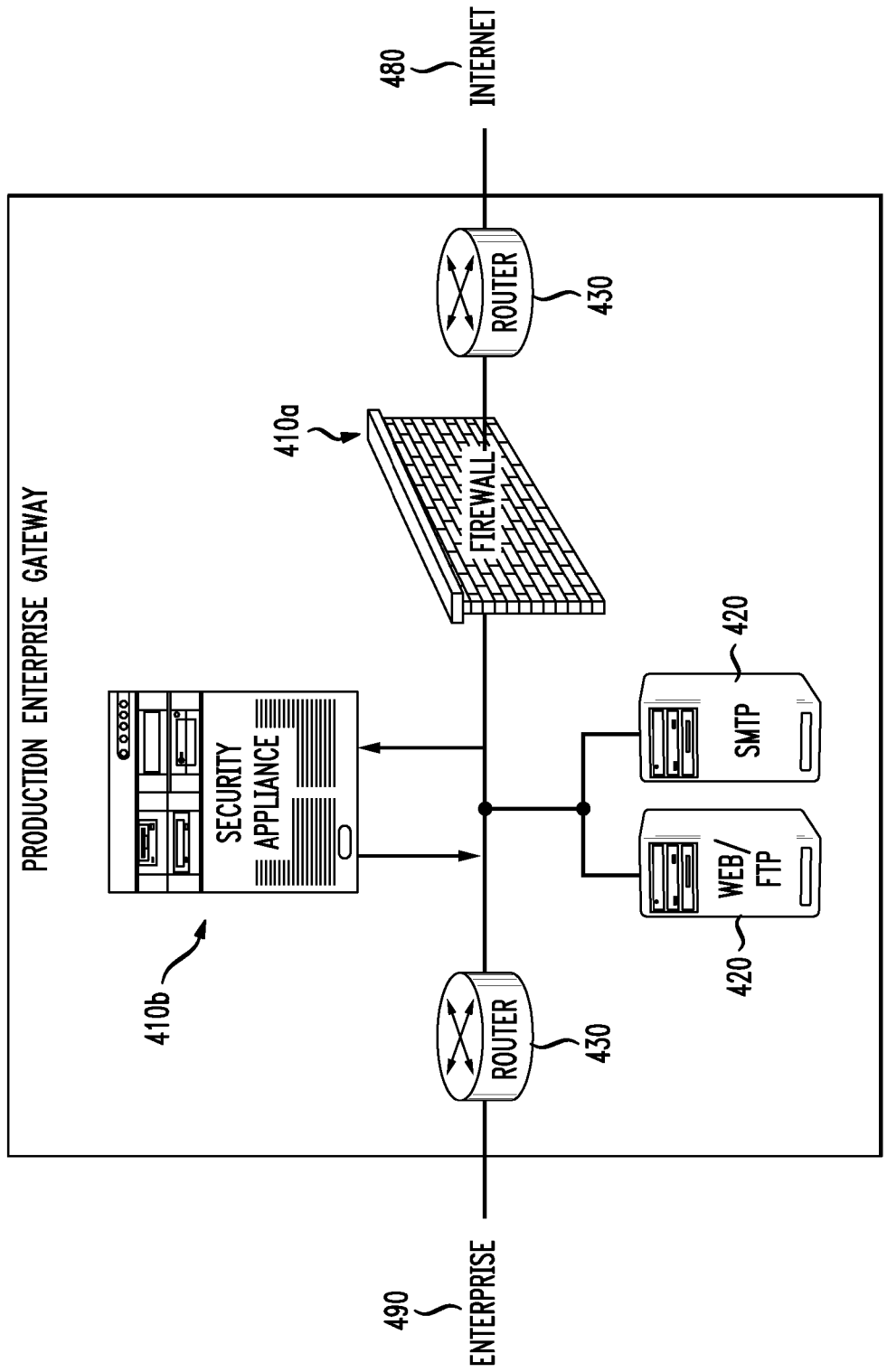
FIG. 4 is a block diagram of an exemplary production network that can be virtualized.

FIG. 4 is a block diagram of an exemplary production enterprise gateway 400 (hereinafter "gateway 400") between a service provider network 480 and a customer network 490. The gateway 400 can include one or more security appliances 410, one or more servers 420, and one or more routers 430. Some examples of security appliances 410 can include firewalls, intrusion detection devices, intrusion prevention devices, or other devices that apply policies that govern operations of the gateway, and the like. The servers can be Web/File Transfer Protocol (FTP) servers and/or Simple Mail Transfer Protocol (SMTP) servers the implementation of which being generally known to those skilled in the art. One or more of the security appliances 410 can administer security policies within the gateway 400 to govern the operation of the servers 420.

In the present embodiment, the security appliance 410a is a firewall between the gateway 400 and the service provider network 480, and the security appliance 410b is a firewall that applies security policies to govern the operation of the components of the gateway 400 (e.g., servers 420, security appliance 410a). For example, the security appliance 410b can control the exclusion or inclusion of incoming and outgoing information between the customer network 490 and the service provider network 480, where incoming information refers to information received by the customer network 490 from the service provider network 480 and outgoing information refers to information sent by the customer network 490 to the service provider network 480. Some examples of security policies that can be implemented include access restriction policies, such as block broadcasts from traversing an interface of a firewall and/or prevent traffic from any Request For Comments (RFC) 1918 private address (defined by the Internet Engineering Task Force (IETF)) from being forwarded over an Internet access circuit; traffic regulation policies, such as block or limit traffic from an source IP address, to a destination IP address, associated with a particular transmission protocol, and/or peer-to-peer (P2P) communication; and the like.

Figure 5:
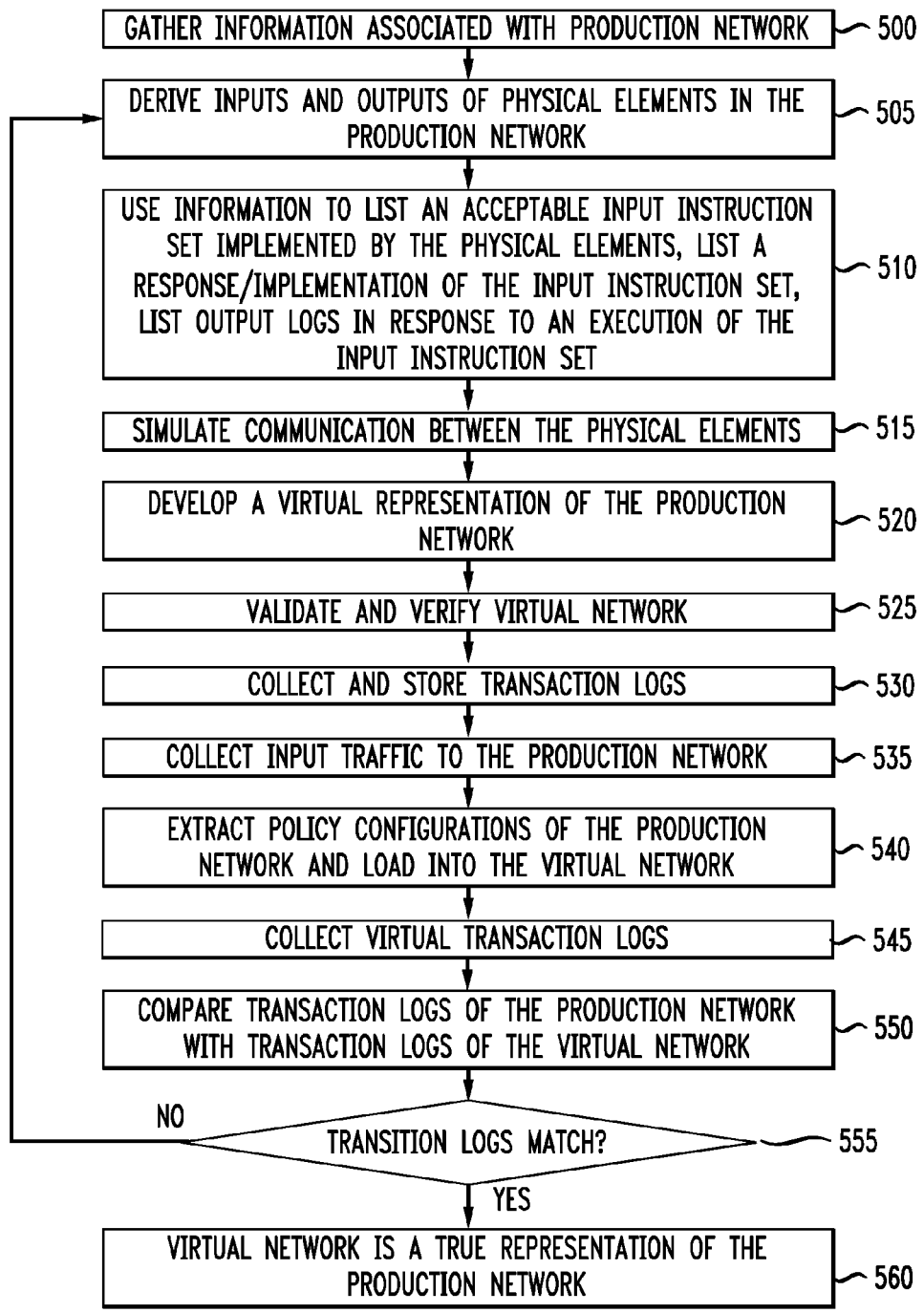
FIG. 5 is a flowchart illustrating a virtualization of a production network.

FIG. 5 is a flowchart illustrating the generation of a virtual network. Embodiments of the present invention can generate a virtual network corresponding to the gateway 400 (FIG. 4). The virtual network can be formed by virtualization of the physical elements in the gateway 400. Information about the network elements of the production network can be gathered (step 500). Such information can include hardware (H/W) specifications (customer H/W specifications and/or vendor H/W specifications), software (S/W) specifications (customer S/W specifications and/or vendor S/W specifications), network performance and test data (customer, testing organizations, etc), customer production network architecture, current policy configurations implemented by the customer, and the like.

Using this information, inputs and outputs for the network elements can be derived (step 505). The key inputs and outputs can be the inputs and outputs that are related to an implementation of network policies. The information can be used to list an acceptable input instruction set implemented by the network elements, list a response/implementation of the input instruction set, list output logs in response to an execution of the input instruction set (step 510). Communication between the physical elements can be simulated based on a model of how information goes from one element to another (step 515).

Operational flow details (e.g., syntax and rules) of the physical elements can be used to develop a virtual representation of the production network such that inputs to the virtual network are processed by virtual elements (e.g., software models) that provide a virtual model of the production network (step 520). In the virtual network, software modules replace physical network elements of the production network. The virtual elements can output virtual transaction logs in response to virtual network traffic to mimic transaction logs that can be output from physical network elements of the production network. The virtual network can be used to accurately simulate the production network and can precisely clone a logical functionality of the production network.

The virtual network can be validated and verified to ensure that it is a true representation of the production network (step 525). For a predetermined test interval, transaction logs for the product network can be collected and stored (step 530). The input traffic to the production network during the test interval is also collected (step 535). The policy configurations of the production network can be extracted and loaded into the virtual network (step 540).

The virtual network can be operated using a replay of input traffic collected from the production network from the test interval. Virtual transaction logs can be collected in response to processing of the replay of input traffic performed by the virtual network (step 545). The transaction logs of the production network can be compared with the virtual transaction logs of the virtual network (step 550). A portion of an exemplary transaction log is provided as follows:

[DD/MMM/YYYY HH:MM:SS] Anti-Spoofing: Packet from LAN, proto:TCP, len:48, ip/port:61.173.81.166:1864→195.39.55.10:445, flags: SYN, seq:3819654104 ack:0, win:16384, tcplen:0

The portion of the transaction log corresponds to an anti-spoofing filter log that can be used for identifying data packets with invalid source IP addresses. The "packet from" item identifies a direction of the data packet (e.g., either from, i.e. sent via the interface, or to, i.e. received via the interface). The "LAN" item identifies an interface name. The "proto" item identifies a transport protocol (TCP, UDP, etc.) associated with the data packet. The "len" item identifies a packet size in bytes (including the headers) associated with the data packet. The "ip/port" item identifies a source IP address, source port, destination IP address, and destination port. The "flags" item is associated with TCP flags. The "seq" item identifies a sequence number of the packet when TCP is used. The "ack" item identifies an acknowledgement sequence number when TCP is used. The "win" item identifies a size of the receive window in bytes, which is used for data flow control when TCP is used. The "tcplen" item identifies a TCP payload size (i.e. size of the data part of the packet) in bytes when TCP is used.

If the transaction logs of the production and virtual networks match (step 555), the virtual network is considered to be a true representation of the production network (560). A match can refer to some or all of the content of the transaction logs having identical information. In some embodiments, a line by-line or item-by-item comparison is not performed, rather the impact of the policy is compared using the content of the transaction logs, such as, for example, what traffic is being blocked using the policy (i.e. how the production and virtualized network respond to the input traffic). In other embodiments, the comparison performed can be a line-by-line or item-by-item comparison of the transaction logs. Otherwise, the process repeats from step 505.

Figure 6:
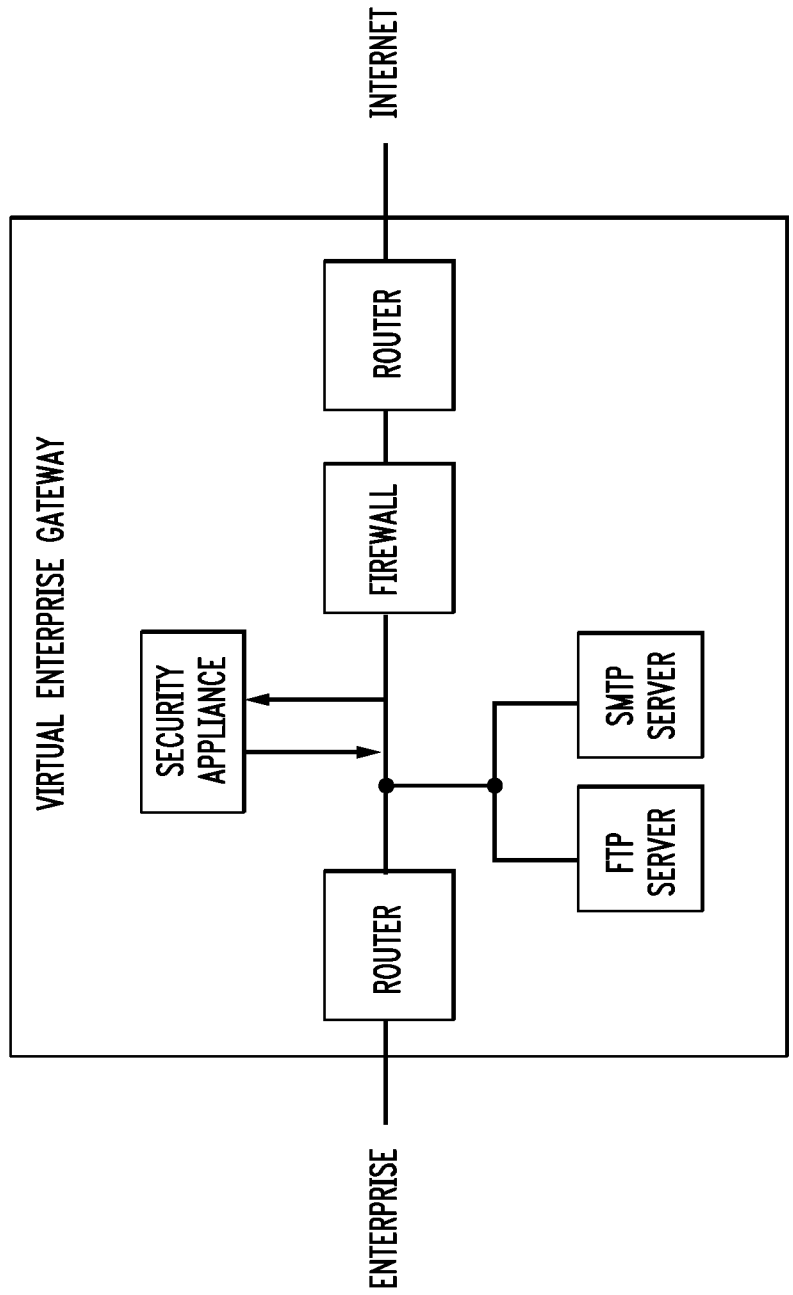
FIG. 6 is a block diagram of an exemplary virtualized network of the production network of FIG. 4

FIG. 6 is a virtualized gateway 600 of the physical production gateway 400 (hereinafter "gateway 400") (FIG. 4). The virtualized gateway 600 is a software model of the gateway 400 that can be generated by the environment 100 (FIG. 1) as described herein. The virtualized gateway 600 can allow a user to determine the effect that policy changes would have on a physical production network without requiring the policy changes to be implemented on the network or a physical replica of the production network. For example, once the virtualized gateway 600 has been validated and verified, the user can implement policy changes in the virtualized gateway and can determine whether the policy changes have a desired effect before the policy changes are deployed in the production network.

Figure 7:
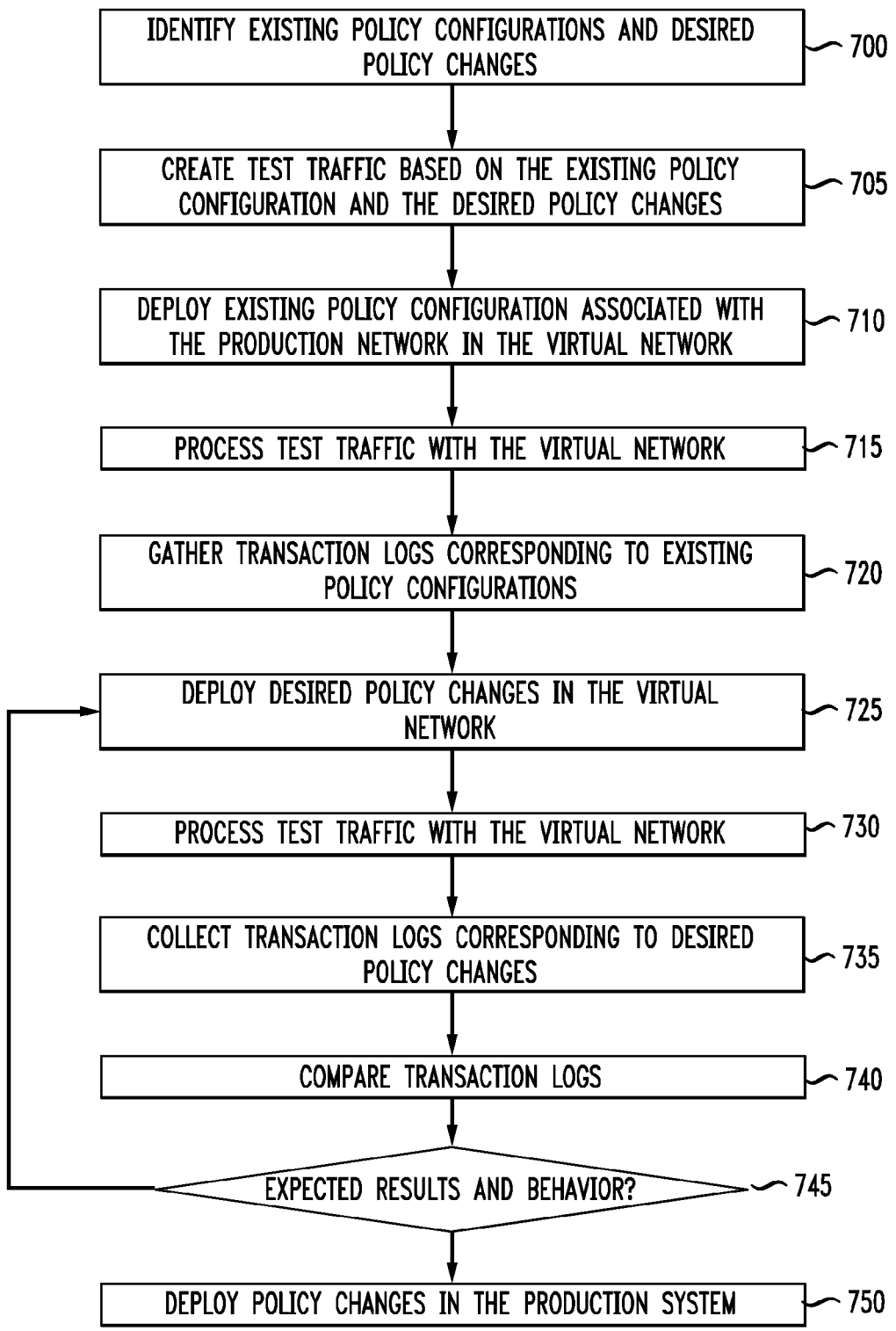
FIG. 7 is a flowchart illustrating an implementation and testing of policy changes in a virtualized network.

FIG. 7 is a flowchart to illustrate an implementation and testing of policy changes. Once the virtual network has been developed and validated, policy changes can be tested in the virtual network before deploying these policy changes in the production network being modeled. Existing policy configurations and desired policy changes are identified (step 700). The existing policy configurations and desired policy changes can be used to create test traffic to test the policies in the virtual network using the test traffic engine (step 705). The test traffic is preferably generated to "truly" portray the traffic to the production network from the Internet. Test traffic is generated to sufficiently test the operational flow of the impact of various policies in the virtual network and is preferably comprehensive enough to test the compliance of existing policies and the policy changes contemplated by the customer. The test traffic is simulated to clone the syntax and rules of the production network and to be capable of testing a comprehensive set of policy configurations that may be deployed by the customer.

In some embodiments, the test traffic is a replica of actual traffic transmitted over the production network. In other embodiments, test traffic is generated to include particular instances of traffic directed to test the policy change, such as P2P traffic that carries pirated content, when a policy change is implemented to prevent reception or transmission of such traffic.

The set of policies currently implemented in the production network are deployed in the virtual network after test traffic is generated (step 710). The test traffic is processed by the virtual network using the existing policy configuration (step 715). Transaction logs corresponding to the execution of the virtual network using the existing policy configuration are gathered (step 720). These transaction logs serve as a benchmark for verifying the compliance of changes to the existing policy configurations. Desired changes to the current customer policy set can be deployed in the virtual network. For example, the policy change can be to the customer security policy that would be implemented in the security appliance 210b (FIG. 2), such as block any P2P file sharing traffic.

The test traffic generated preferably includes traffic that tests the effectiveness of the policy change. Desired policy changes are deployed in the virtual network (step 725). The test traffic is processed by the virtual network using the desired policy changes (step 730). Transaction logs corresponding to the processed test traffic using the desired policy changes are collected (step 735). Transaction logs generated using existing policy and desired policy changes are compared to verify the policy changes (step 740). The verification can be performed by analyzing the two sets of transaction logs and identifying differences in the transaction logs to ensure that the differences are only due to the desired policy changes. If the changed policy set produces the expected results and behavior (step 745), the policy changes can be deployed in the production system (step 750). If the testing produces unexplained results or unexpected behavior (step 745), the process repeats from step 725.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of testing policy changes associated with a production network comprising:
   generating a virtual network representing a portion of the production network;
   obtaining a first transaction log based on a first execution of the virtual network using test traffic and a first set of policies that are implemented in the production network;
   obtaining a second transaction log based on a second execution of the virtual network using the test traffic and a second set of policies to be implemented in the production network, the second set of policies including a policy that blocks broadcasts from traversing an interface of a firewall and a policy that blocks traffic from a private address from being forwarded over an Internet access circuit; and
   determining an effect that the second set of policies has on the virtual network based on a comparison of the first and second transaction logs.

2. The method of claim 1 further comprising generating the test traffic based on the first and second sets of policies, the test traffic configured to facilitate determining the effect that the second set of policies has on the virtual network.

3. The method of claim 1, further comprising:
   obtaining preliminary transaction logs for the virtual network and the production network using production traffic; and
   determining whether the virtual network model represents the production network based on a comparison of the preliminary transaction logs.

4. The method of claim 1, wherein it is determined that the second set of policies does not have a desired effect and the method further comprising:
   obtaining a third transaction log based on an execution of the virtual network using the test traffic and a third set of policies; and
   determining an effect that the third set of policies has on the virtual network based on a comparison of the first and third transaction logs.

5. The method of claim 1, wherein generating a virtual network comprises:
   obtaining information associated with physical elements of the production network; and
   generating virtual elements of the physical elements based on the information, the virtual elements modeling a logical functionality of the physical elements.

6. The method of claim 5, wherein the information includes at least one of hardware specifications, software specifications, network performance data, an architecture of the production network, and the first set of policies.

7. The method of claim 1, wherein the second set of policies includes an access restriction policy and a traffic regulation policy.

8. The method of claim 1, wherein the second set of policies includes a policy that blocks traffic from a predetermined source IP address, traffic to a predetermined destination IP address, traffic associated with a particular transmission protocol, or peer-to-peer communication traffic.

9. A system to test policy changes associated with a production network comprising:
   a processing device; and
   a memory to store instructions that, when executed by the processing device perform operations comprising:
   generating a virtual network representing a portion of the production network;
   obtaining a first transaction log based on a first execution of the virtual network using test traffic and a first set of policies that are implemented in the production network;
   obtaining a second transaction log based on a second execution of the virtual network using the test traffic and a second set of policies to be implemented in the production network; and
   determining an effect that the second set of policies has on the virtual network based on a comparison of the first and second transaction logs, the second set of policies including a policy that blocks broadcasts from traversing an interface of a firewall and a policy that prevents traffic from a private address from being forwarded over an Internet access circuit.

10. The system of claim 9, wherein the operations further comprise generating the test traffic based on the first and second sets of policies, the test traffic facilitating a determination of the effect that the second set of policies has on the virtual network.

11. The system of claim 9, wherein the operations further comprise obtaining preliminary transaction logs for the virtual network and the production network using production traffic, the processing device being further configured to determine whether the virtual network model represents the production network based on a comparison of the preliminary transaction logs.

12. The system of claim 9, wherein the operations further comprise obtaining a third transaction log based on an execution of the virtual network using the test traffic and a third set of policies in response the processing device determining that the second set of policies does not have a desired effect, and the processing device being further configured to determine an effect that the third set of policies has on the virtual network based on a comparison of the first and third transaction logs.

13. The system of claim 9, wherein the second set of policies includes a policy that blocks broadcasts from traversing an interface of a firewall and a policy that prevents traffic from a private address from being forwarded over an Internet access circuit.

14. A non-transitory computer-readable storage medium comprising instructions that, when executed by a computing device, causes the computing device to perform operations comprising:
   generating a virtual network representing a portion of a production network;
   obtaining a first transaction log based on a first execution of the virtual network using test traffic and a first set of policies that are implemented in the production network;
   obtaining a second transaction log based on a second execution of the virtual network using the test traffic and a second set of policies to be implemented in the production network; and
   determining an effect that the second set of policies has on the virtual network based on a comparison of the first and second transaction logs, the second set of policies including a policy that blocks broadcasts from traversing an interface of a firewall and a policy that prevents traffic from a private address from being forwarded over an Internet access circuit.

15. The non-transitory computer-readable storage medium of claim 14, wherein the operations further comprise generating the test traffic based on the first and second sets of policies, the test traffic configured to facilitate determining the effect that the second set of policies has on the virtual network.

16. The non-transitory computer-readable storage medium of claim 14, wherein the operations further comprise:
   obtaining preliminary transaction logs for the virtual network and the production network using production traffic; and
   determining whether the virtual network model represents the production network based on a comparison of the preliminary transaction logs.

17. The non-transitory computer-readable storage medium of claim 14, wherein it is determined that the second set of policies does not have a desired effect and the operations further comprise:
   obtaining a third transaction log based on an execution of the virtual network using the test traffic and a third set of policies; and
   determining an effect that the third set of policies has on the virtual network based on a comparison of the first and third transaction logs.

18. The non-transitory computer-readable storage medium of claim 14, wherein generating a virtual network further comprises:
   obtaining information associated with physical elements of the production network; and
   generating virtual elements of the physical elements based on the information, the virtual elements modeling a logical functionality of the physical elements.

19. The non-transitory computer-readable storage medium of claim 18, wherein the information includes of hardware specifications, software specifications, network performance data, an architecture of the production network, and the first set of policies.

20. The non-transitory computer-readable storage medium of claim 14, wherein the second set of policies includes a policy that blocks traffic from a predetermined source IP address, traffic to a predetermined destination IP address, traffic associated with a particular transmission protocol, and peer-to-peer communication traffic.

* * * * *